Figure 1:
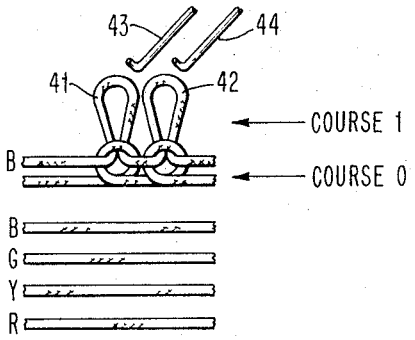
Figure 2:
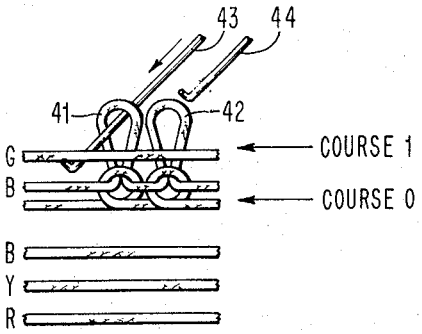
Figure 3:
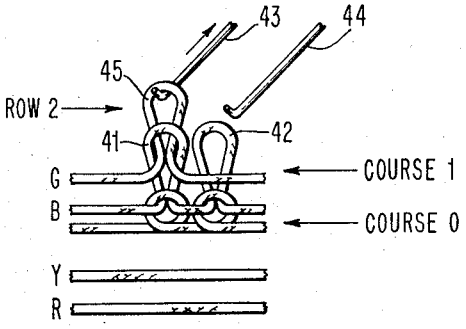
Figure 4:
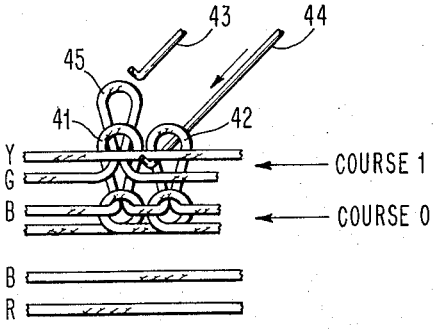
Figure 5:
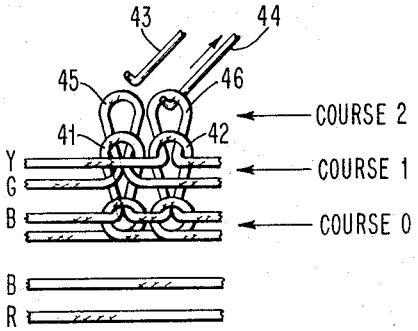
Figures 9, 10:
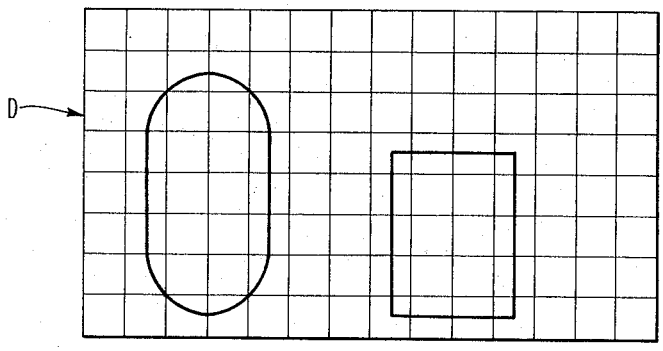
Figure 11:
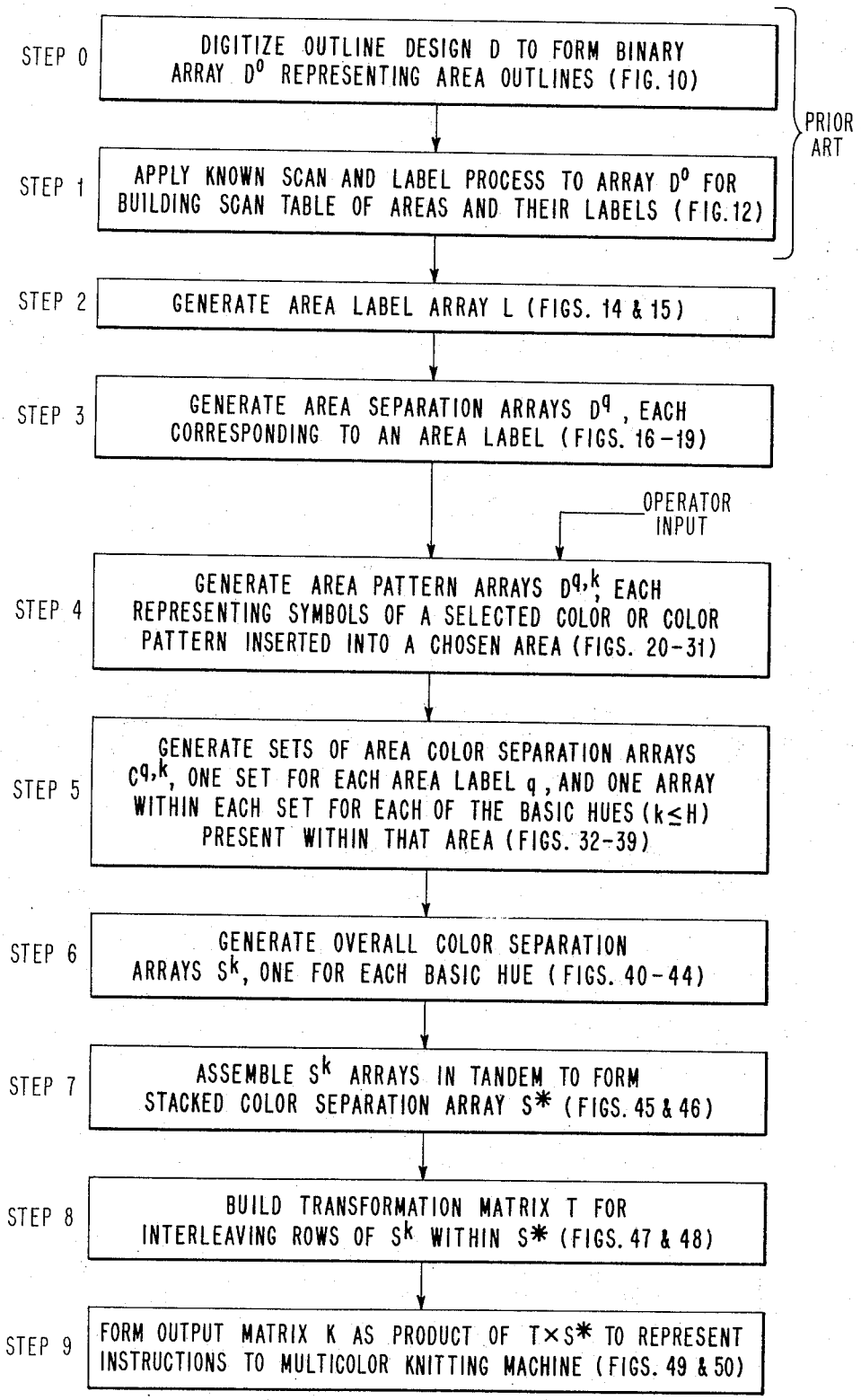
Figures 13, 14:
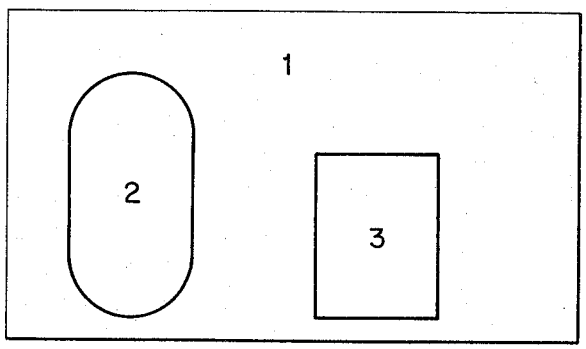
Figure 15:
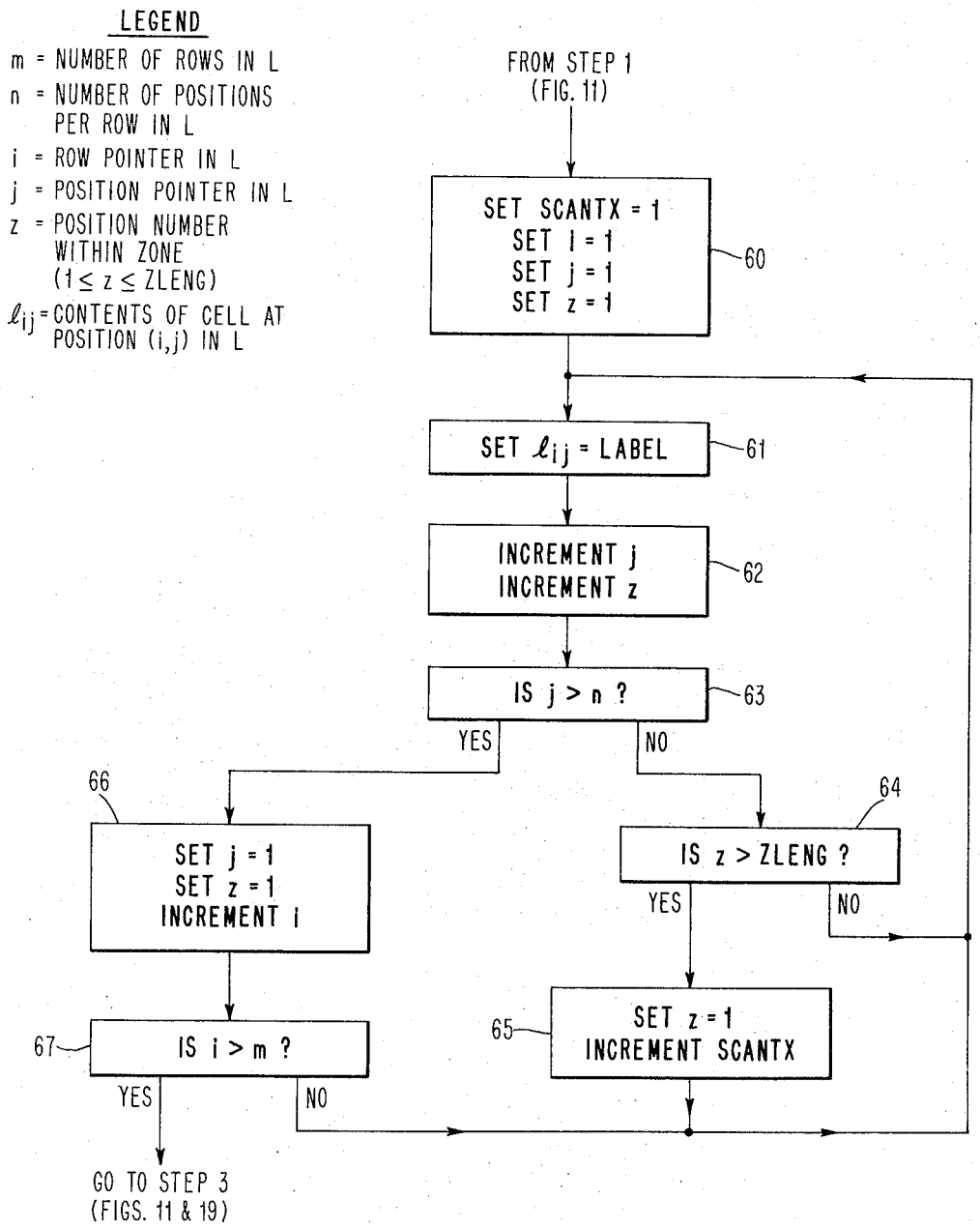
Figure 19:
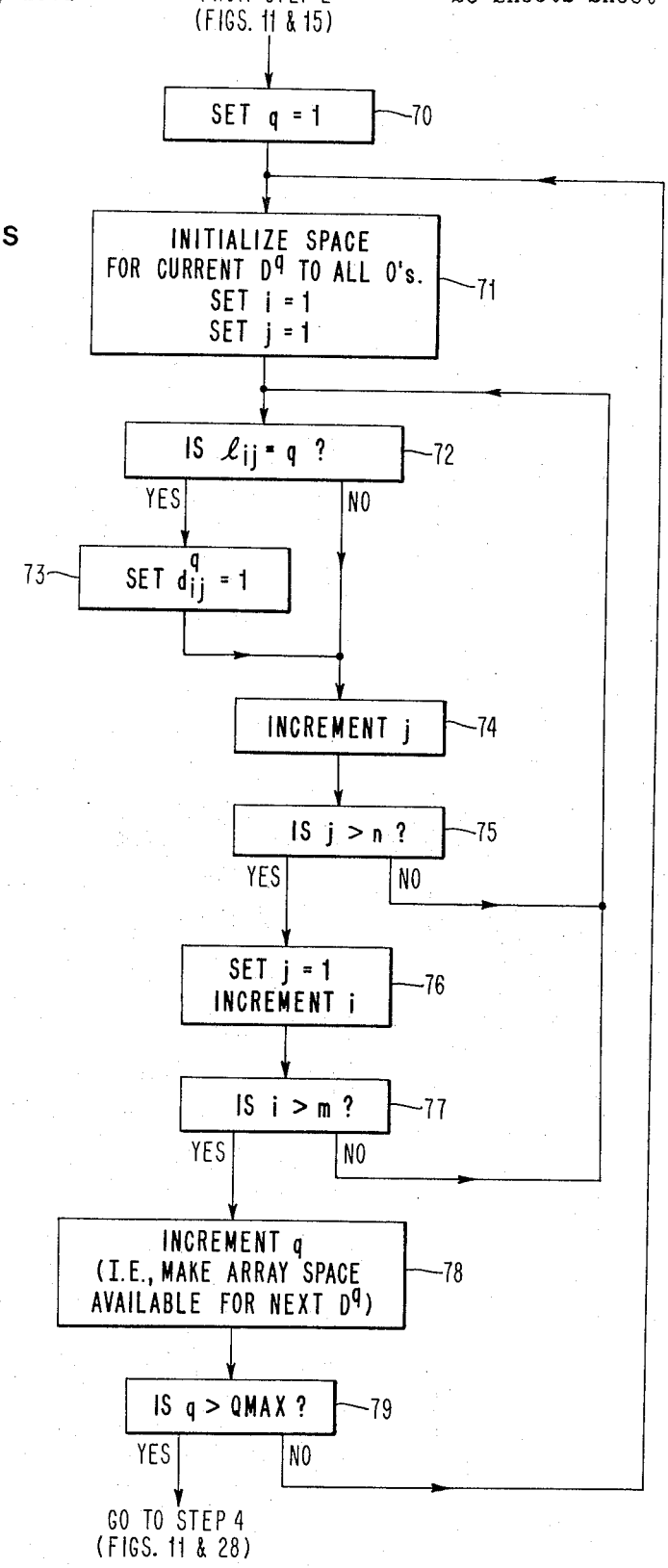
Figure 28:
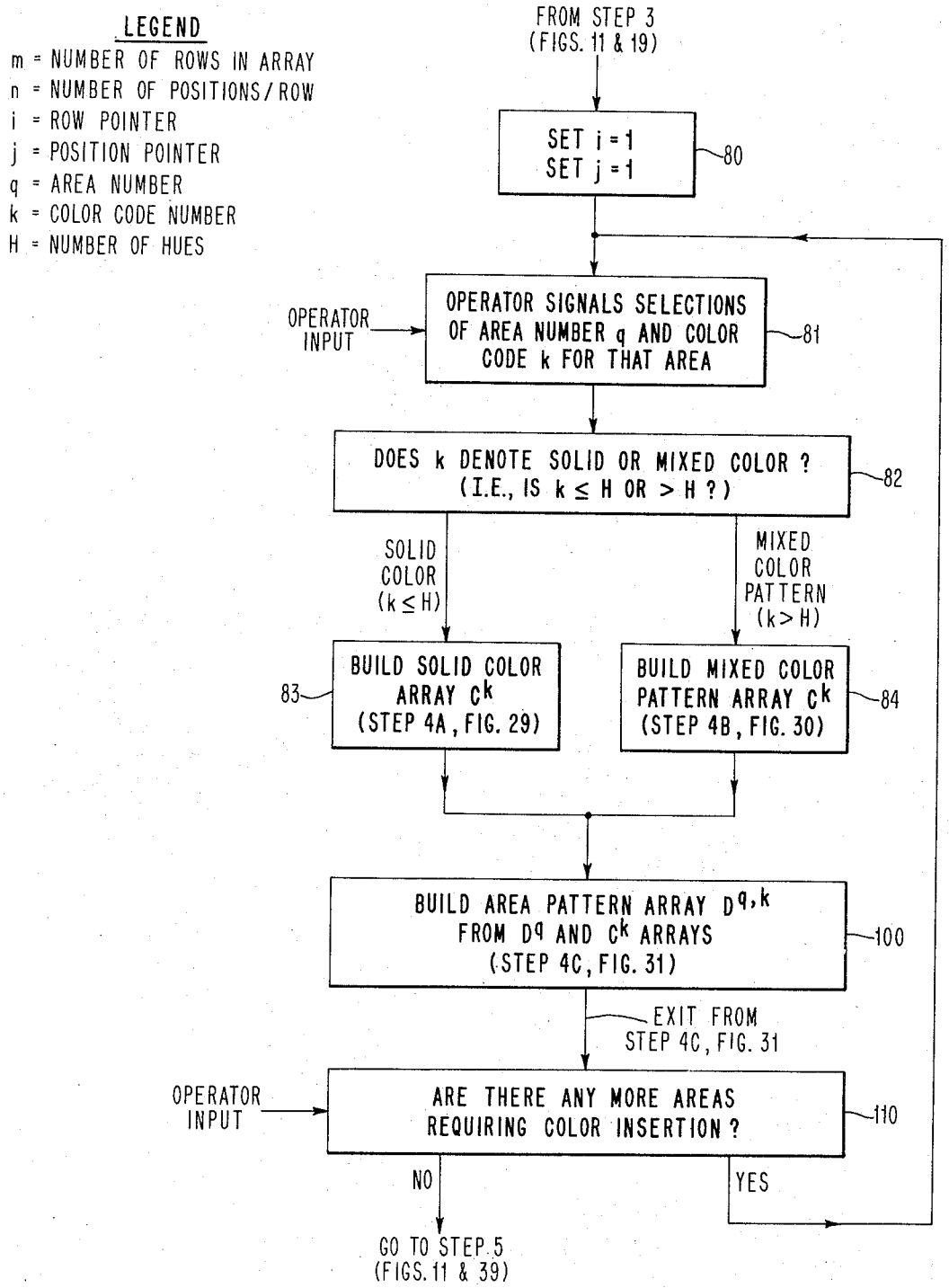
Figure 29:
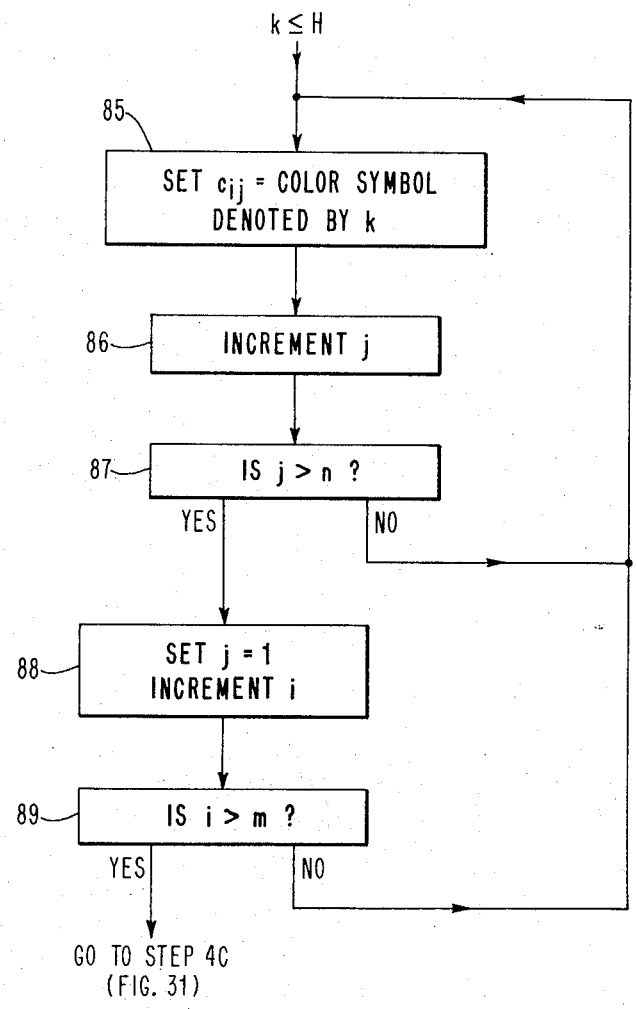
Figure 30:
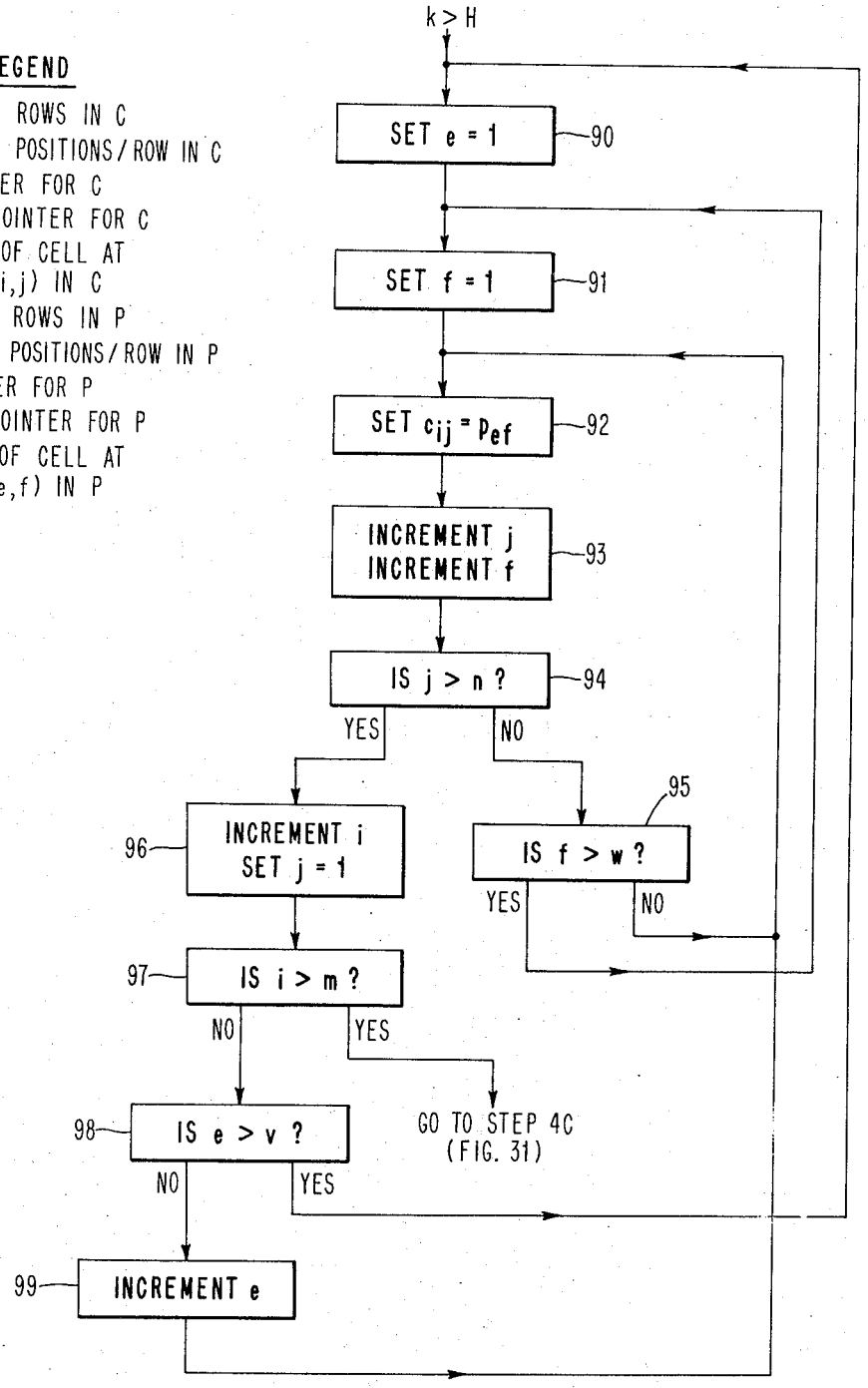
Figure 31:
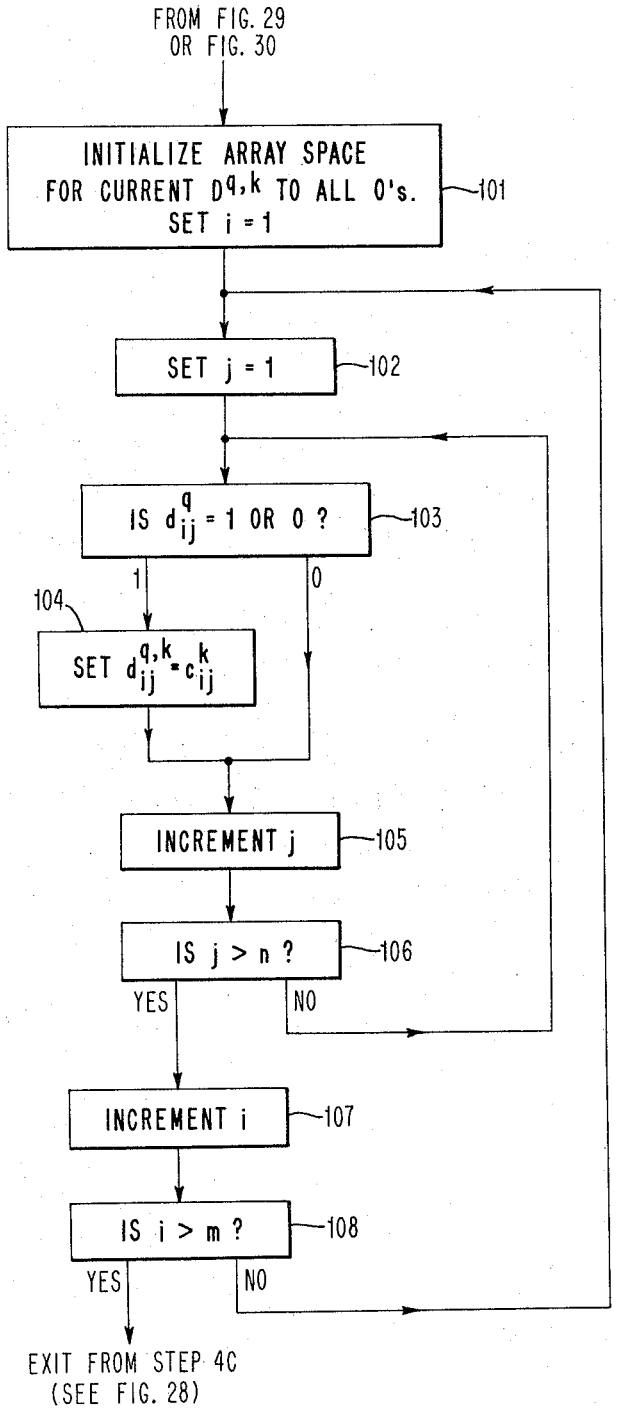
Figure 39:
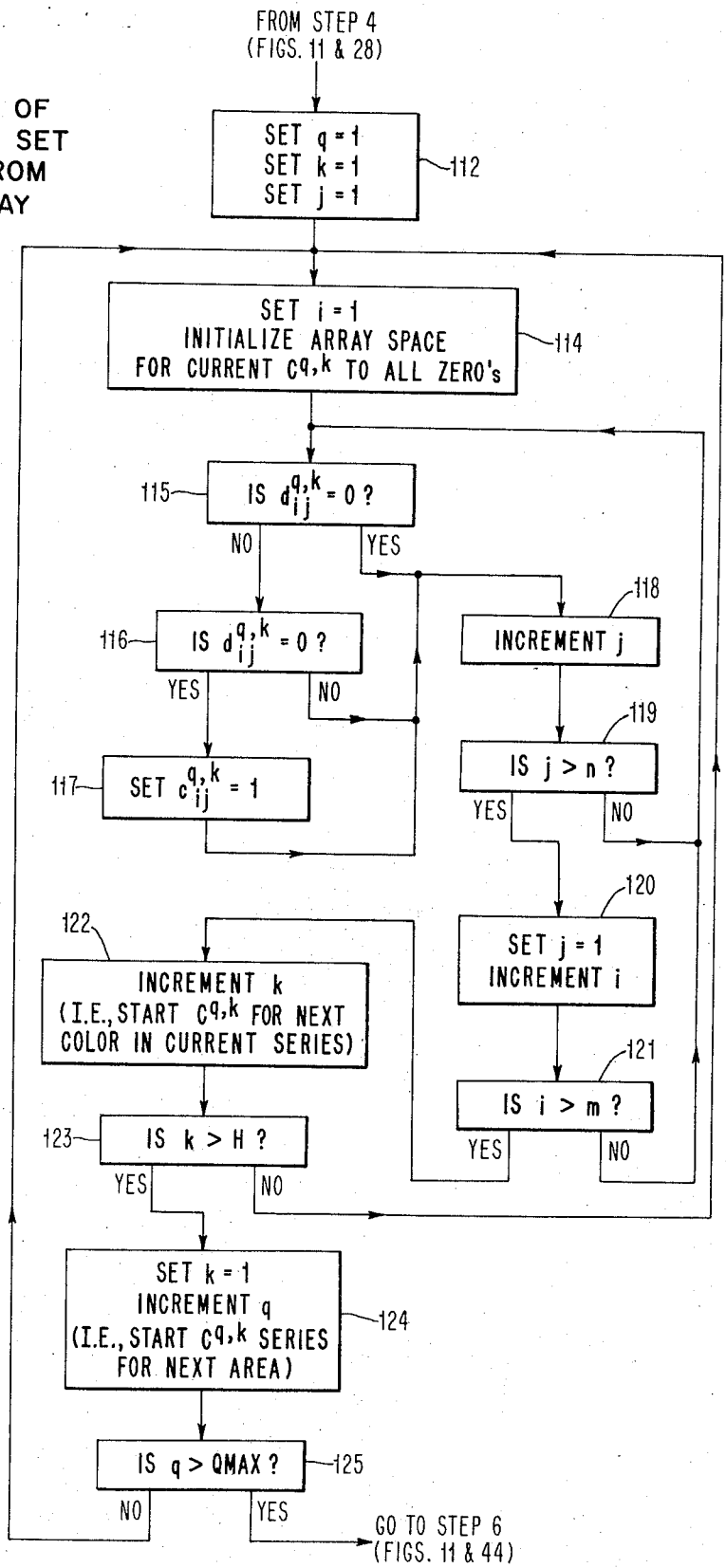
Figure 44:
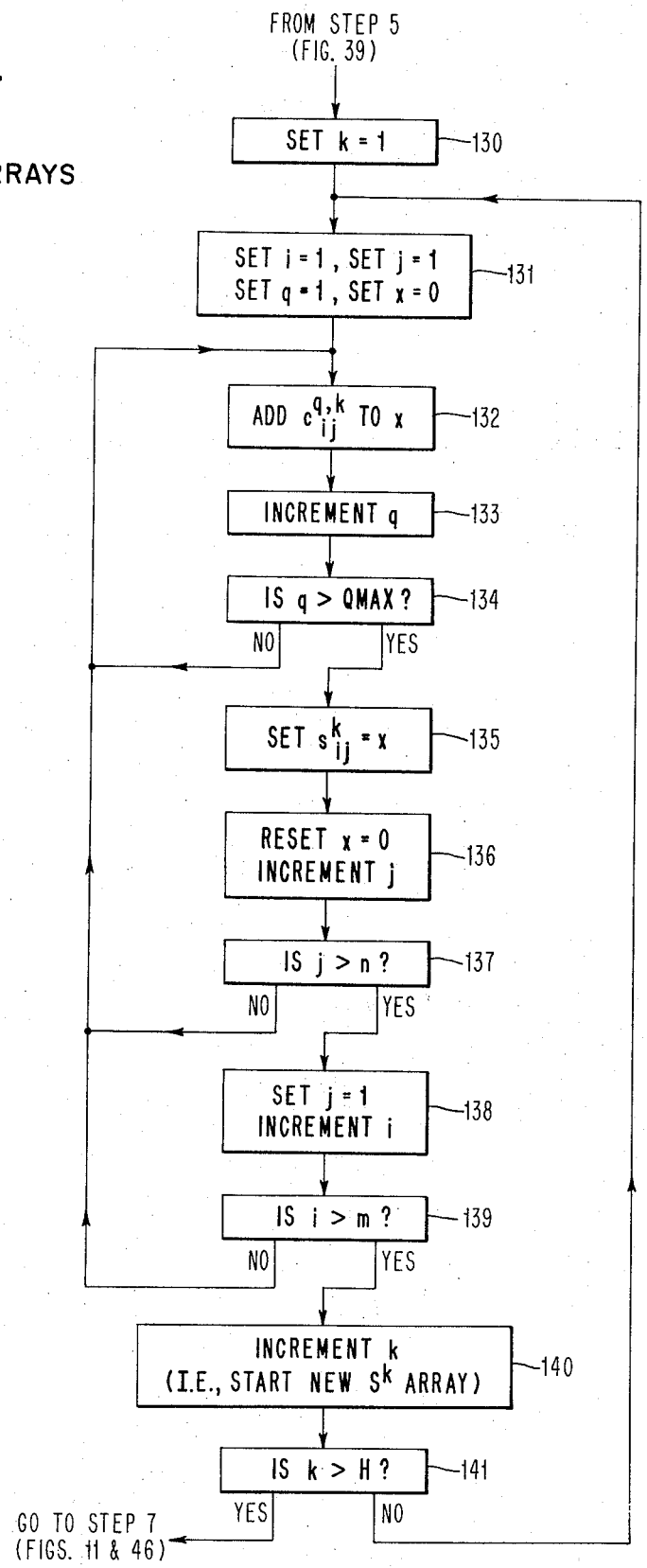
Figure 46:
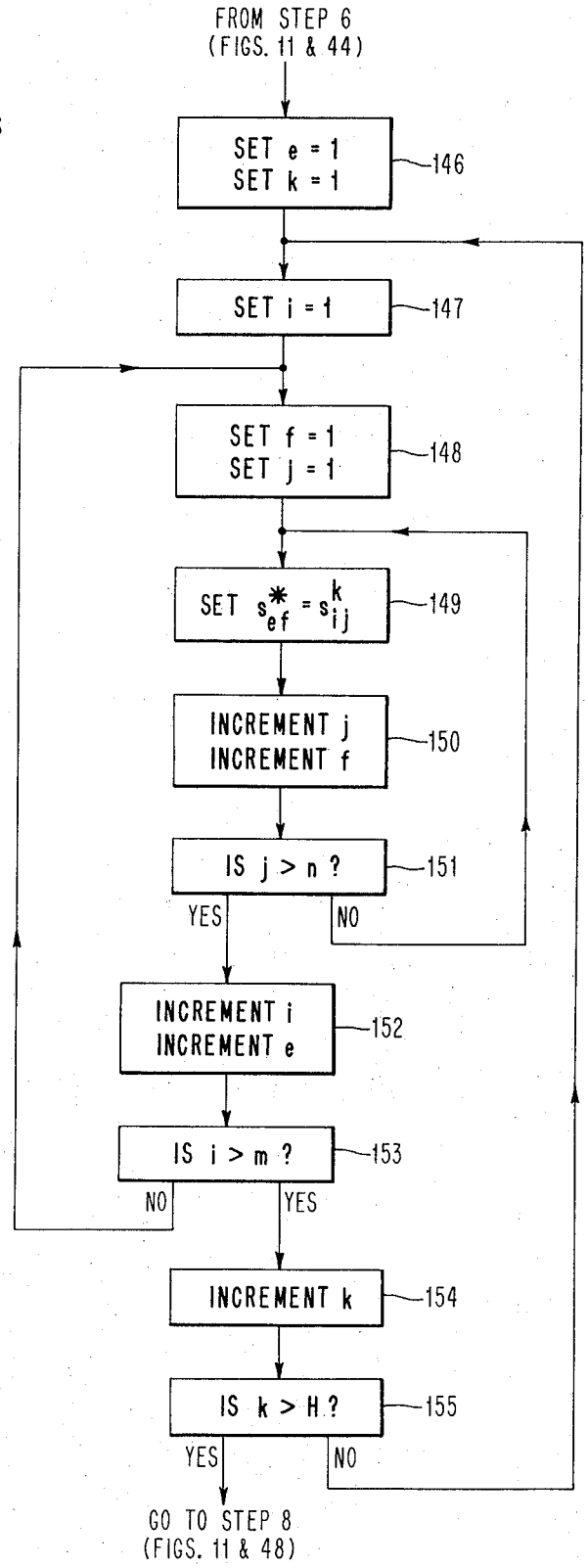
Figure 47:
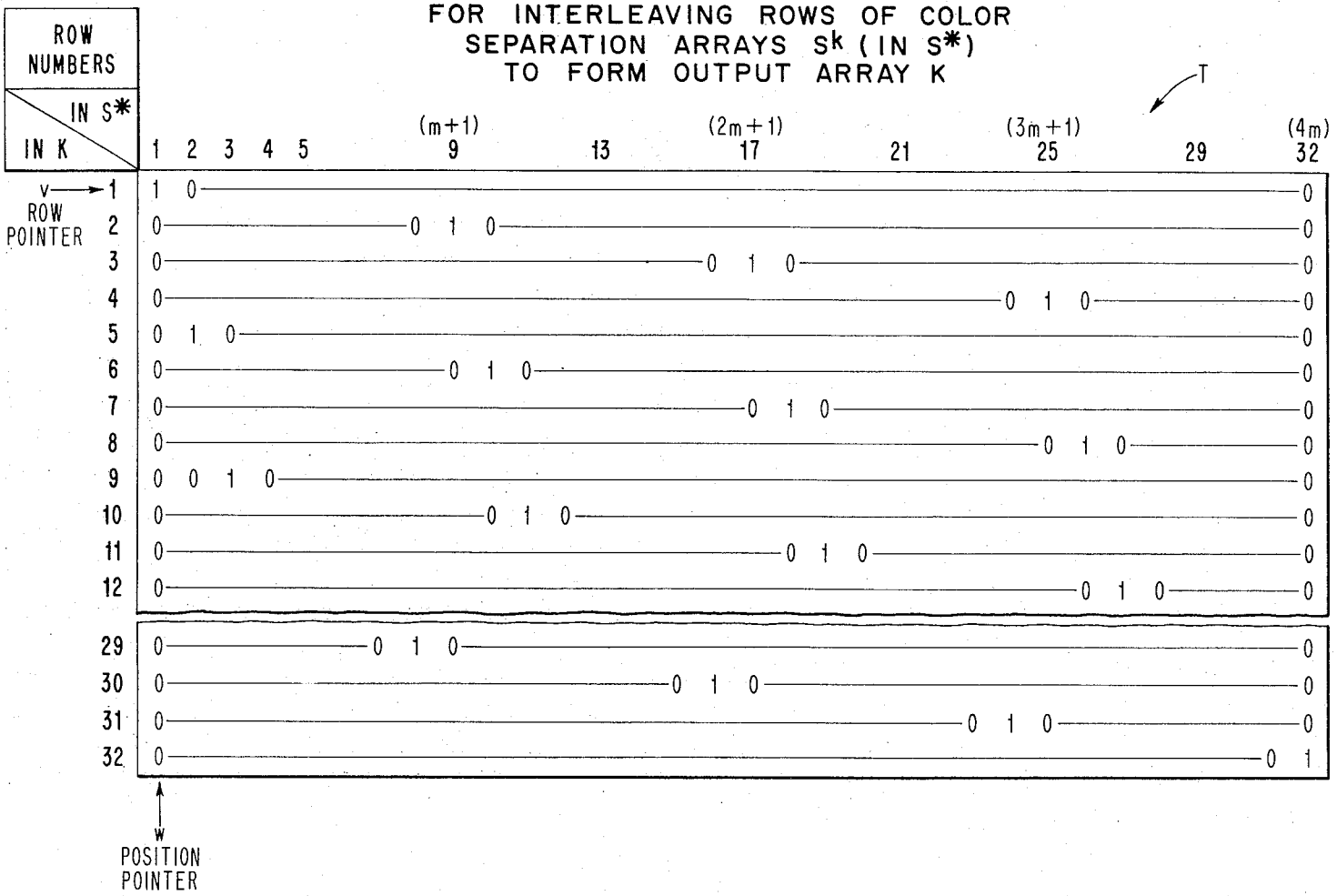
Figure 48:
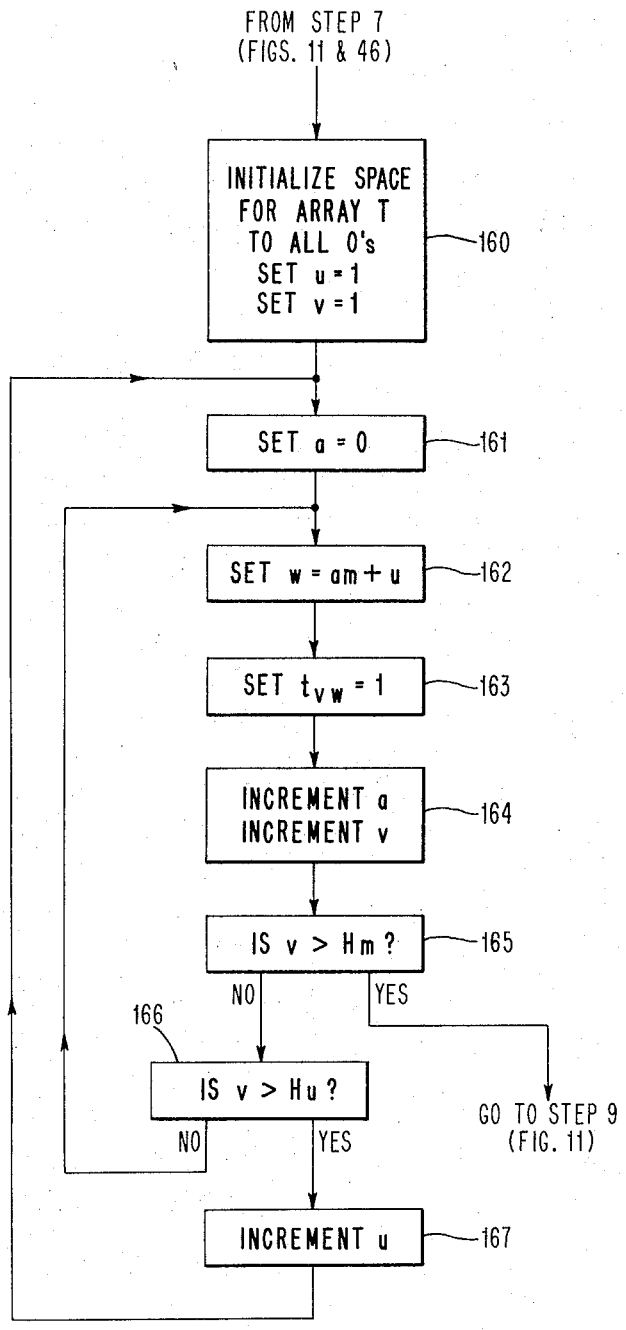
Figures 50, 51:
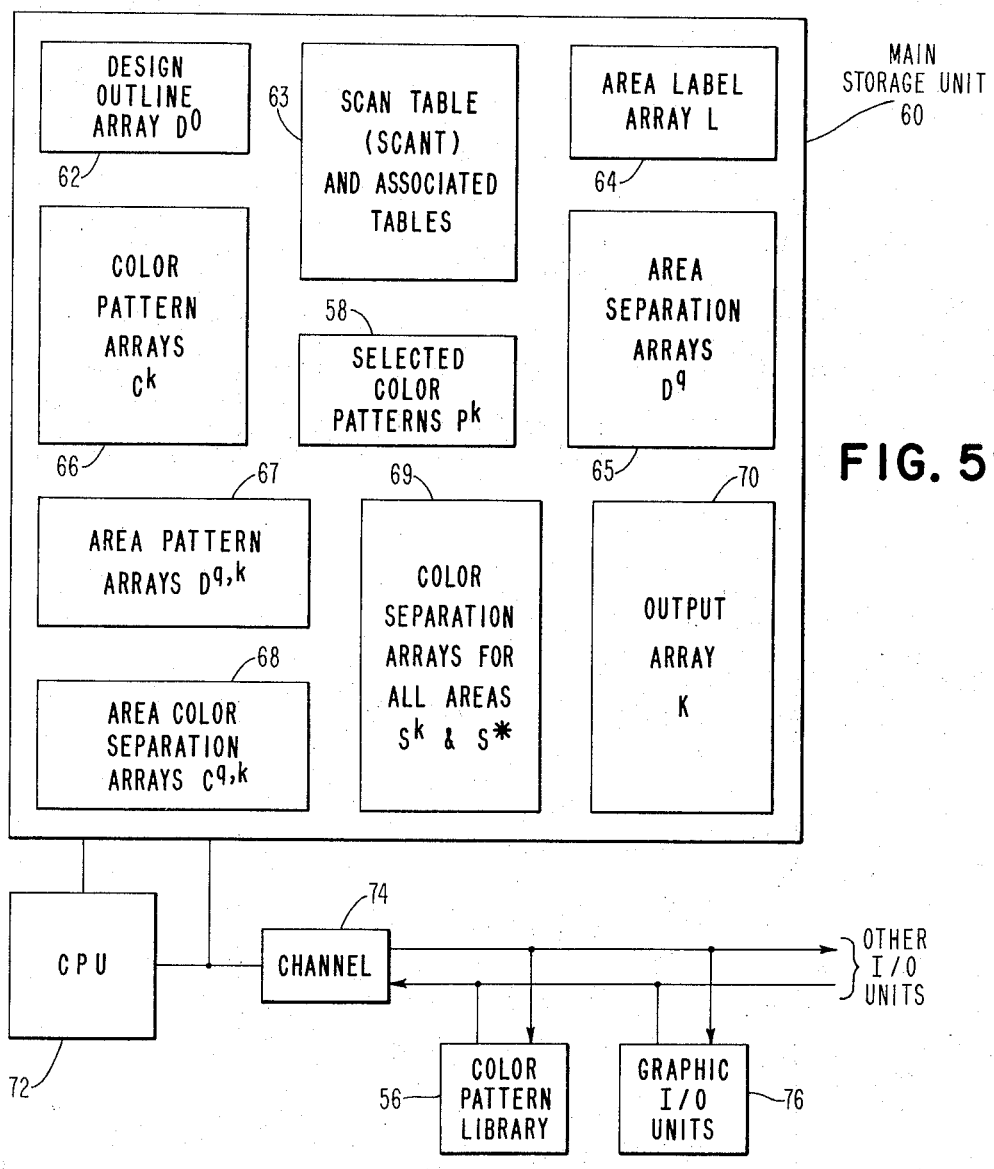

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 868

T921,021

PROCESSING OF DATA FROM MULTICOLOR OR OTHER MULTISYMBOL DESIGNS

Nitta P. Dooner, Janice Richmond Lourie, and Lin S. Woo, New York, N.Y., assignors to International Business Machines Corporation, Armonk, N.Y.

Continuation of application Ser. No. 209,955, Dec. 20, 1971. This application Aug. 9, 1973, Ser. No. 387,073

Int. Cl. G06f *9/12*

U.S. Cl. 444—1

26 Sheets Drawing. 47 Pages Specification

GENERAL FLOW DIAGRAM

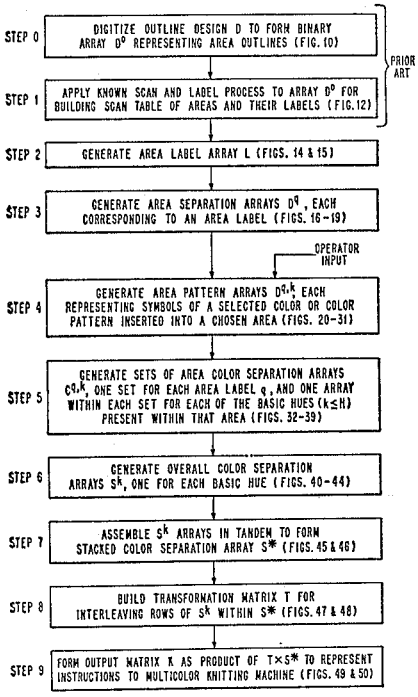

A computer-aided method of developing a digitized multicolor design, including representations of arbitrary multicolor patterns inserted into arbitrarily defined areas of the design, and separating the color information in a color-by-color, row-by-row fashion to provide operating instructions for enabling a multicolor knitting machine to produce the design in fabric. The principal steps are shown in the general flow diagram. Steps 0 and 1 are known (U.S. Pats. Nos. 3,529,298 and 3,644,935). In step 2 an array of area label numbers is generated. In step 3 separate binary arrays are generated to represent the respective labeled areas. In step 4 arrays are generated to represent the selected color patterns in chosen areas. Color patterns may comprise solid or mixed colors. In step 5 binary arrays are generated to represent design elements separated by area and by color. In step 6 binary arrays are formed to show, for each color, where elements having that color are placed in the overall design. In steps 7, 8 and 9 the overall color separation arrays are arranged first in tandem, then are interleaved to represent binary instructions for operating the knitting needles in color-by-color, course-by-course fashion.

PROCESSING OF DATA FOR MULTICOLOR OR OTHER MULTISYMBOL DESIGNS

Original Filed Dec. 20, 1971 26 Sheets-Sheet 1

B = BLUE
G = GREEN
Y = YELLOW
R = RED

| WEFT ROWS OR COURSES | 1 | 2 | 3 | 4 | 5 |
|---|---|---|---|---|---|
| 3 | R | R | Y | Y | R |
| 2 | G | Y | Y | G | G |
| 1 | B | B | G | G | Y |

STITCH POSITIONS OR WALES

FIG. 6

EXAMPLE OF MULTICOLOR STITCH ARRANGEMENT

B = BLUE Y = YELLOW
G = GREEN R = RED

| COURSE | COLOR | STITCH POSITIONS 1 | 2 | 3 | 4 | 5 |
|---|---|---|---|---|---|---|
| 1 | B | 1 | 1 | 0 | 0 | 0 |
| | G | 0 | 0 | 1 | 1 | 0 |
| | Y | 0 | 0 | 0 | 0 | 1 |
| | R | 0 | 0 | 0 | 0 | 0 |
| 2 | B | 0 | 0 | 0 | 0 | 0 |
| | G | 1 | 0 | 0 | 1 | 1 |
| | Y | 0 | 1 | 1 | 0 | 0 |
| | R | 0 | 0 | 0 | 0 | 0 |
| 3 | B | 0 | 0 | 0 | 0 | 0 |
| | G | 0 | 0 | 0 | 0 | 0 |
| | Y | 0 | 0 | 1 | 1 | 0 |
| | R | 1 | 1 | 0 | 0 | 1 |

51

50

FIG. 7

INSTRUCTIONS TO MULTICOLOR KNITTING MACHINE

FIG. 8 COLOR CODE TABLE

| CODE NUMBER k | COLOR SYMBOLS | BINARY COLOR CODES | |
|---|---|---|---|
| 1 | B | 001 | SINGLE COLORS OR HUES (NUMBER OF AVAILABLE HUES = H) |
| 2 | G | 010 | |
| 3 | Y | 011 | |
| 4 | R | 100 | |
| 5 AND HIGHER | MULTI-COLOR PATTERNS | COMBINATIONS OF ABOVE CODES | PATTERNS OF MIXED COLORS |

DESIGN OUTLINE
DRAWN UPON COORDINATE GRID

DESIGN OUTLINE ARRAY $D^0$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |
| 0 | 1 | 0 | 0 | 1 | 0 | 0 | 0 | 0 | 0 | 0 | 0 | 0 | 0 |
| 0 | 1 | 0 | 0 | 1 | 0 | 0 | 1 | 1 | 1 | 1 | 0 | 0 | 0 |
| 0 | 1 | 0 | 0 | 1 | 0 | 0 | 1 | 0 | 0 | 1 | 0 | 0 | 0 |
| 0 | 1 | 0 | 0 | 1 | 0 | 0 | 1 | 0 | 0 | 1 | 0 | 0 | 0 |
| 0 | 1 | 0 | 0 | 1 | 0 | 0 | 1 | 0 | 0 | 1 | 0 | 0 | 0 |
| 0 | 0 | 1 | 1 | 0 | 0 | 0 | 1 | 1 | 1 | 1 | 0 | 0 | 0 |

FIG. 11 GENERAL FLOW DIAGRAM

FIG. 12

SCAN TABLE
(SCANT)

| SCANTX | ZLENG | LABEL |
|---|---|---|
| 1 | 2 | 1 |
| 2 | 2 | 2 |
| 3 | 3 | 1 |
| 4 | 4 | 3 |
| 5 | 3 | 1 |
| 6 | 1 | 1 |
| 7 | 4 | 2 |
| 8 | 2 | 1 |
| 9 | 4 | 3 |
| 10 | 3 | 1 |
| 11 | 1 | 1 |
| 12 | 4 | 2 |
| 13 | 2 | 1 |
| 14 | 4 | 3 |
| 15 | 3 | 1 |
| 16 | 1 | 1 |
| 17 | 4 | 2 |
| 18 | 2 | 1 |
| 19 | 4 | 3 |
| 20 | 3 | 1 |
| 21 | 1 | 1 |
| 22 | 4 | 2 |
| 23 | 2 | 1 |
| 24 | 4 | 3 |
| 25 | 3 | 1 |
| 26 | 1 | 1 |
| 27 | 4 | 2 |
| 28 | 9 | 1 |
| 29 | 2 | 1 |
| 30 | 2 | 2 |
| 31 | 10 | 1 |
| 32 | 14 | 1 |

AREA LABELS

AREA LABEL ARRAY

| | | | | | | | | | | | | | |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 2 | 2 | 1 | 1 | 1 | 1 | 1 | 1 | 1 | 1 | 1 | 1 |
| 1 | 2 | 2 | 2 | 2 | 1 | 1 | 1 | 1 | 1 | 1 | 1 | 1 | 1 |
| 1 | 2 | 2 | 2 | 2 | 1 | 1 | 3 | 3 | 3 | 3 | 1 | 1 | 1 |
| 1 | 2 | 2 | 2 | 2 | 1 | 1 | 3 | 3 | 3 | 3 | 1 | 1 | 1 |
| 1 | 2 | 2 | 2 | 2 | 1 | 1 | 3 | 3 | 3 | 3 | 1 | 1 | 1 |
| 1 | 2 | 2 | 2 | 2 | 1 | 1 | 3 | 3 | 3 | 3 | 1 | 1 | 1 |
| 1 | 1 | 2 | 2 | 1 | 1 | 1 | 3 | 3 | 3 | 3 | 1 | 1 | 1 |

L i ROW POINTER j POSITION POINTER

STEP 2
FORM AREA LABEL ARRAY (L)

$D^1$

| | | | | | | | | | | | | | |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 0 | 0 | 1 | 1 | 1 | 1 | 1 | 1 | 1 | 1 | 1 | 1 |
| 1 | 0 | 0 | 0 | 0 | 1 | 1 | 1 | 1 | 1 | 1 | 1 | 1 | 1 |
| 1 | 0 | 0 | 0 | 0 | 1 | 1 | 0 | 0 | 0 | 0 | 1 | 1 | 1 |
| 1 | 0 | 0 | 0 | 0 | 1 | 1 | 0 | 0 | 0 | 0 | 1 | 1 | 1 |
| 1 | 0 | 0 | 0 | 0 | 1 | 1 | 0 | 0 | 0 | 0 | 1 | 1 | 1 |
| 1 | 0 | 0 | 0 | 0 | 1 | 1 | 0 | 0 | 0 | 0 | 1 | 1 | 1 |
| 1 | 1 | 0 | 0 | 1 | 1 | 1 | 0 | 0 | 0 | 0 | 1 | 1 | 1 |

i → ROW POINTER j POSITION POINTER

FIG. 16

AREA SEPARATION ARRAY FOR AREA NO. 1

$D^2$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |

FIG. 17

AREA SEPARATION ARRAY FOR AREA NO. 2

$D^3$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 1 | 1 | 0 | 0 | 0 |
| 0 | 0 | 0 | 0 | 0 | 0 | 0 | 1 | 1 | 1 | 1 | 0 | 0 | 0 |
| 0 | 0 | 0 | 0 | 0 | 0 | 0 | 1 | 1 | 1 | 1 | 0 | 0 | 0 |
| 0 | 0 | 0 | 0 | 0 | 0 | 0 | 1 | 1 | 1 | 1 | 0 | 0 | 0 |
| 0 | 0 | 0 | 0 | 0 | 0 | 0 | 1 | 1 | 1 | 1 | 0 | 0 | 0 |

FIG. 18

AREA SEPARATION ARRAY FOR AREA NO. 3

STEP 3

FORM AREA SEPARATION ARRAYS $D^q$

LEGEND q = AREA NUMBER

QMAX = TOTAL NUMBER OF DISTINCT AREAS (HIGHEST LABEL IN SCANT)

m = NUMBER OF ROWS IN L & $D^q$ n = NUMBER OF POSITIONS IN L & $D^q$ PER ROW i = ROW POINTER IN L & $D^q$ j = POSITION POINTER IN L & $D^q$ $\ell_{ij}$ = CONTENTS OF CELL AT POSITION (i,j) IN L $d^q_{ij}$ = CONTENTS OF CELL AT POSITION (i,j) IN $D^q$ $C^2$

| | | | | | | | | | | | | | |
|---|---|---|---|---|---|---|---|---|---|---|---|---|---|
| G | G | G | G | G | G | G | G | G | G | G | G | G | G |
| G | G | G | G | G | G | G | G | G | G | G | G | G | G |
| G | G | G | G | G | G | G | G | G | G | G | G | G | G |
| G | G | G | G | G | G | G | G | G | G | G | G | G | G |
| G | G | G | G | G | G | G | G | G | G | G | G | G | G |
| G | G | G | G | G | G | G | G | G | G | G | G | G | G |
| G | G | G | G | G | G | G | G | G | G | G | G | G | G |
| G | G | G | G | G | G | G | G | G | G | G | G | G | G |

FIG. 20

EXAMPLE OF SINGLE COLOR ARRAY FOR COLOR NO. 2 (GREEN)

$D^{2,2}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | G | G | 0 | 0 | 0 | 0 | 0 | 0 | 0 | 0 | 0 | 0 |
| 0 | G | G | G | G | 0 | 0 | 0 | 0 | 0 | 0 | 0 | 0 | 0 |
| 0 | G | G | G | G | 0 | 0 | 0 | 0 | 0 | 0 | 0 | 0 | 0 |
| 0 | G | G | G | G | 0 | 0 | 0 | 0 | 0 | 0 | 0 | 0 | 0 |
| 0 | G | G | G | G | 0 | 0 | 0 | 0 | 0 | 0 | 0 | 0 | 0 |
| 0 | G | G | G | G | 0 | 0 | 0 | 0 | 0 | 0 | 0 | 0 | 0 |
| 0 | 0 | G | G | 0 | 0 | 0 | 0 | 0 | 0 | 0 | 0 | 0 | 0 |

FIG. 21

AREA PATTERN ARRAY (COLOR PATTERN NO. 2 INSERTED INTO AREA NO. 2)

FIG. 23

MIXED COLOR ARRAY $C^5$ BUILT UP FROM MIXED COLOR PATTERN $P^5$

| | | | | | | | | | | | | | |
|---|---|---|---|---|---|---|---|---|---|---|---|---|---|
| R | R | R | R | R | R | R | R | R | R | R | R | R | R |
| R | Y | Y | R | R | Y | Y | R | R | Y | Y | R | R | Y |
| R | Y | Y | R | R | Y | Y | R | R | Y | Y | R | R | Y |
| R | R | R | R | R | R | R | R | R | R | R | R | R | R |
| R | R | R | R | R | R | R | R | R | R | R | R | R | R |
| R | Y | Y | R | R | Y | Y | R | R | Y | Y | R | R | Y |
| R | Y | Y | R | R | Y | Y | R | R | Y | Y | R | R | Y |
| R | R | R | R | R | R | R | R | R | R | R | R | R | R |

i → ROW POINTER j POSITION POINTER $C^5$

FIG. 22

MIXED COLOR PATTERN FOR COLOR CODE NO. 5

| | | | |
|---|---|---|---|
| R | R | R | R |
| R | Y | Y | R |
| R | Y | Y | R |
| R | R | R | R |

e → ROW POINTER f POSITION POINTER $P^5$ $D^{1,5}$

| | | | | | | | | | | | | | |
|---|---|---|---|---|---|---|---|---|---|---|---|---|---|
| R | R | R | R | R | R | R | R | R | R | R | R | R | R |
| R | Y | 0 | 0 | R | Y | Y | R | R | Y | Y | R | R | Y |
| R | 0 | 0 | 0 | 0 | Y | Y | R | R | Y | Y | R | R | Y |
| R | 0 | 0 | 0 | 0 | R | R | 0 | 0 | 0 | 0 | R | R | R |
| R | 0 | 0 | 0 | 0 | R | R | 0 | 0 | 0 | 0 | R | R | R |
| R | 0 | 0 | 0 | 0 | Y | Y | 0 | 0 | 0 | 0 | R | R | Y |
| R | 0 | 0 | 0 | 0 | Y | Y | 0 | 0 | 0 | 0 | R | R | Y |
| R | R | 0 | 0 | R | R | R | 0 | 0 | 0 | 0 | R | R | R |

FIG. 24

AREA PATTERN ARRAY (COLOR PATTERN NO. 5 INSERTED INTO AREA NO. 1)

FIG. 26

MIXED COLOR ARRAY $C^6$ BUILT UP FROM MIXED COLOR PATTERN $P^6$

| | | | | | | | | | | | | | |
|---|---|---|---|---|---|---|---|---|---|---|---|---|---|
| B | Y | B | Y | B | Y | B | Y | B | Y | B | Y | B | Y |
| R | B | R | B | R | B | R | B | R | B | R | B | R | B |
| B | Y | B | Y | B | Y | B | Y | B | Y | B | Y | B | Y |
| R | B | R | B | R | B | R | B | R | B | R | B | R | B |
| B | Y | B | Y | B | Y | B | Y | B | Y | B | Y | B | Y |
| R | B | R | B | R | B | R | B | R | B | R | B | R | B |
| B | Y | B | Y | B | Y | B | Y | B | Y | B | Y | B | Y |
| R | B | R | B | R | B | R | B | R | B | R | B | R | B |

$C^6$

FIG. 25

MIXED COLOR PATTERN FOR COLOR CODE NO. 6

| | |
|---|---|
| B | Y |
| R | B |

$P^6$ $D^{3,6}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | B | R | B | R | 0 | 0 | 0 |
| 0 | 0 | 0 | 0 | 0 | 0 | 0 | Y | B | Y | B | 0 | 0 | 0 |
| 0 | 0 | 0 | 0 | 0 | 0 | 0 | B | R | B | R | 0 | 0 | 0 |
| 0 | 0 | 0 | 0 | 0 | 0 | 0 | Y | B | Y | B | 0 | 0 | 0 |
| 0 | 0 | 0 | 0 | 0 | 0 | 0 | B | R | B | R | 0 | 0 | 0 |

FIG. 27

AREA PATTERN ARRAY (COLOR PATTERN NO. 6 INSERTED INTO AREA NO. 3)

STEP 4

BUILD $D^{q,k}$ ARRAY FOR EACH AREA TO REPRESENT COLORS THEREIN

STEP 4A

BUILD SOLID COLOR ARRAY $C^k$

LEGEND m = NUMBER OF ROWS
n = NUMBER OF POSITIONS
i = ROW POINTER
j = POSITION POINTER
$c_{ij}$ = CONTENTS OF CELL AT POSITION (i,j) IN ARRAY $C^k$

STEP 4B

BUILD MIXED COLOR ARRAY $C^k$ FROM SUBPATTERN $P^k$

LEGEND

- m = NUMBER OF ROWS IN C
- n = NUMBER OF POSITIONS/ROW IN C
- i = ROW POINTER FOR C
- j = POSITION POINTER FOR C
- $c_{ij}$ = CONTENTS OF CELL AT POSITION (i,j) IN C
- v = NUMBER OF ROWS IN P
- w = NUMBER OF POSITIONS/ROW IN P
- e = ROW POINTER FOR P
- f = POSITION POINTER FOR P
- $p_{ef}$ = CONTENTS OF CELL AT POSITION (e,f) IN P

STEP 4C

BUILD $D^{q,k}$ FROM $D^q$ AND $C^k$

LEGEND q = AREA NUMBER
k = COLOR CODE NUMBER
m = NUMBER OF ROWS
n = NUMBER OF POSITIONS
i = ROW POINTER
j = POSITION POINTER
$c_{ij}^k$ = CONTENTS OF CELL AT POSITION (i,j) IN ARRAY $C^k$
$d_{ij}^q$ = CONTENTS OF CELL AT POSITION (i,j) IN ARRAY $D^q$
$d_{ij}^{q,k}$ = CONTENTS OF CELL AT POSITION (i,j) IN ARRAY $D^{q,k}$ $C^{1,1}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG. 32

AREA COLOR SEPARATION ARRAY

COLOR NO. 1 (BLUE) IN AREA NO. 1

$C^{1,2}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG. 33

AREA COLOR SEPARATION ARRAY

COLOR NO. 2 (GREEN) IN AREA NO. 1

$C^{1,3}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 1 | 0 | 0 | 0 | 1 | 1 | 0 | 0 | 1 | 1 | 0 | 0 | 1 |
| 0 | 0 | 0 | 0 | 0 | 1 | 1 | 0 | 0 | 1 | 1 | 0 | 0 | 1 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 1 | 1 | 0 | 0 | 0 | 0 | 0 | 0 | 1 |
| 0 | 0 | 0 | 0 | 0 | 1 | 1 | 0 | 0 | 0 | 0 | 0 | 0 | 1 |
| 0 | 0 | 0 | 0 | 0 | 0 | 0 | 0 | 0 | 0 | 0 | 0 | 0 | 0 |

FIG. 34

AREA COLOR SEPARATION ARRAY

COLOR NO. 3 (YELLOW) IN AREA NO. 1

$C^{1,4}$

| | | | | | | | | | | | | | |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 0 | 0 | 0 | 1 | 0 | 0 | 1 | 1 | 0 | 0 | 1 | 1 | 0 |
| 1 | 0 | 0 | 0 | 0 | 0 | 0 | 1 | 1 | 0 | 0 | 1 | 1 | 0 |
| 1 | 0 | 0 | 0 | 0 | 1 | 1 | 0 | 0 | 0 | 0 | 1 | 1 | 1 |
| 1 | 0 | 0 | 0 | 0 | 1 | 1 | 0 | 0 | 0 | 0 | 1 | 1 | 1 |
| 1 | 0 | 0 | 0 | 0 | 0 | 0 | 0 | 0 | 0 | 0 | 1 | 1 | 0 |
| 1 | 0 | 0 | 0 | 0 | 0 | 0 | 0 | 0 | 0 | 0 | 1 | 1 | 0 |
| 1 | 1 | 0 | 0 | 1 | 1 | 1 | 0 | 0 | 0 | 0 | 1 | 1 | 1 |

FIG. 35

AREA COLOR SEPARATION ARRAY

COLOR NO. 4 (RED) IN AREA NO. 1

$C^{2,2}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |

FIG. 36

AREA COLOR SEPARATION ARRAY

COLOR NO. 2 (GREEN) IN AREA NO. 2

$C^{3,1}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 0 | 0 | 0 | 1 | 0 | 1 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 0 | 0 | 0 | 1 | 0 | 1 | 0 | 0 | 0 |
| 0 | 0 | 0 | 0 | 0 | 0 | 0 | 1 | 0 | 1 | 0 | 0 | 0 | 0 |

FIG. 37

AREA COLOR SEPARATION ARRAY

COLOR NO. 1 (BLUE) IN AREA NO. 3

$C^{3,3}$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 0 | 0 | 0 | 0 | 0 | 0 | 0 | 0 | 0 |

FIG. 38

AREA COLOR SEPARATION ARRAY

COLOR NO. 3 (YELLOW) IN AREA NO. 3

STEP 5

GENERATE SETS OF $C^{q,k}$ ARRAYS, ONE SET BEING BUILT FROM EACH $D^{q,k}$ ARRAY

LEGEND m = NUMBER OF ROWS
n = POSITIONS / ROW
i = ROW POINTER
j = POSITION POINTER
H = NUMBER OF HUES
QMAX = NUMBER OF AREAS
$c_{ij}^{q,k}$ = CONTENTS OF CELL AT POSITION (i,j) OF $C^{q,k}$
$d_{ij}^{q,k}$ = CONTENTS OF CELL AT POSITION (i,j) OF $D^{q,k}$ $S^1$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 0 | 0 | 0 | 1 | 0 | 1 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 0 | 0 | 0 | 1 | 0 | 1 | 0 | 0 | 0 |
| 0 | 0 | 0 | 0 | 0 | 0 | 0 | 1 | 0 | 1 | 0 | 0 | 0 | 0 |

i ROW POINTER j POSITION POINTER

FIG. 40

OVERALL COLOR SEPARATION ARRAY FOR COLOR NO. 1 (BLUE) IN ALL AREAS $S^2$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 |

FIG. 41

OVERALL COLOR SEPARATION ARRAY FOR COLOR NO. 2 (GREEN) IN ALL AREAS $S^3$

| | | | | | | | | | | | | | |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 1 | 0 | 0 | 0 | 1 | 1 | 0 | 0 | 1 | 1 | 0 | 0 | 1 |
| 0 | 0 | 0 | 0 | 0 | 1 | 1 | 0 | 0 | 1 | 1 | 0 | 0 | 1 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 1 | 0 | 0 | 0 | 0 |
| 0 | 0 | 0 | 0 | 0 | 1 | 1 | 0 | 0 | 0 | 0 | 0 | 0 | 1 |
| 0 | 0 | 0 | 0 | 0 | 1 | 1 | 1 | 0 | 1 | 0 | 0 | 0 | 1 |
| 0 | 0 | 0 | 0 | 0 | 0 | 0 | 0 | 0 | 0 | 0 | 0 | 0 | 0 |

FIG. 42

OVERALL COLOR SEPARATION ARRAY FOR COLOR NO. 3 (YELLOW) IN ALL AREAS $S^4$

| | | | | | | | | | | | | | |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 0 | 0 | 0 | 1 | 0 | 0 | 1 | 1 | 0 | 0 | 1 | 1 | 0 |
| 1 | 0 | 0 | 0 | 0 | 0 | 0 | 1 | 1 | 0 | 0 | 1 | 1 | 0 |
| 1 | 0 | 0 | 0 | 0 | 1 | 1 | 0 | 1 | 0 | 1 | 1 | 1 | 1 |
| 1 | 0 | 0 | 0 | 0 | 1 | 1 | 0 | 0 | 0 | 0 | 1 | 1 | 1 |
| 1 | 0 | 0 | 0 | 0 | 0 | 0 | 0 | 1 | 0 | 1 | 1 | 1 | 0 |
| 1 | 0 | 0 | 0 | 0 | 0 | 0 | 0 | 0 | 0 | 0 | 1 | 1 | 0 |
| 1 | 1 | 0 | 0 | 1 | 1 | 1 | 0 | 1 | 0 | 1 | 1 | 1 | 1 |

FIG. 43

OVERALL COLOR SEPARATION ARRAY FOR COLOR NO. 4 (RED) IN ALL AREAS

STEP 6

GENERATE $S^k$ ARRAYS

LEGEND q = AREA NUMBER
QMAX = NUMBER OF AREAS
k = COLOR CODE NUMBER
i = ROW POINTER
j = POSITION POINTER
m = NUMBER OF ROWS
n = POSITIONS / ROW
$c_{ij}^{q,k}$ = CONTENTS OF CELL AT POSITION (i,j) IN $C^{q,k}$
x = SUM OF ALL BITS $c_{ij}^{q,k}$ FOR ONE COLOR k AND ALL q VALUES
$s_{ij}^{k}$ = CONTENTS OF CELL AT POSITION (i,j) IN $S^k$

FIG. 45

$S^k$ ARRAYS STACKED TO FORM $S^*$ ARRAY $S^*$

| ROW NUMBERS | 1 | 2 | 3 | 4 | 5 | 6 | 7 | 8 | 9 | 10 | 11 | 12 | 13 | 14 | |
|---|---|---|---|---|---|---|---|---|---|---|---|---|---|---|---|
| 32 | 1 | 1 | 1 | 1 | 1 | 1 | 1 | 1 | 1 | 1 | 1 | 1 | 1 | 1 | S4 (RED) |
| 31 | 1 | 0 | 0 | 0 | 1 | 0 | 0 | 1 | 1 | 0 | 0 | 1 | 1 | 0 | |
| 30 | 1 | 0 | 0 | 0 | 0 | 0 | 0 | 1 | 1 | 0 | 0 | 1 | 1 | 0 | |
| 29 | 1 | 0 | 0 | 0 | 0 | 1 | 1 | 0 | 1 | 0 | 1 | 1 | 1 | 1 | |
| 28 | 1 | 0 | 0 | 0 | 0 | 1 | 1 | 0 | 0 | 0 | 0 | 1 | 1 | 1 | |
| 27 | 1 | 0 | 0 | 0 | 0 | 0 | 0 | 0 | 1 | 0 | 1 | 1 | 1 | 0 | |
| 26 | 1 | 0 | 0 | 0 | 0 | 0 | 0 | 0 | 0 | 0 | 0 | 1 | 1 | 0 | |
| 25 | 1 | 1 | 0 | 0 | 1 | 1 | 1 | 0 | 1 | 0 | 1 | 1 | 1 | 1 | |
| 24 | 0 | 0 | 0 | 0 | 0 | 0 | 0 | 0 | 0 | 0 | 0 | 0 | 0 | 0 | S3 (YELLOW) |
| 23 | 0 | 1 | 0 | 0 | 0 | 1 | 1 | 0 | 0 | 1 | 1 | 0 | 0 | 1 | |
| 22 | 0 | 0 | 0 | 0 | 0 | 1 | 1 | 0 | 0 | 1 | 1 | 0 | 0 | 1 | |
| 21 | 0 | 0 | 0 | 0 | 0 | 0 | 0 | 0 | 0 | 0 | 0 | 0 | 0 | 0 | |
| 20 | 0 | 0 | 0 | 0 | 0 | 0 | 0 | 1 | 0 | 1 | 0 | 0 | 0 | 0 | |
| 19 | 0 | 0 | 0 | 0 | 0 | 1 | 1 | 0 | 0 | 0 | 0 | 0 | 0 | 1 | |
| 18 | 0 | 0 | 0 | 0 | 0 | 1 | 1 | 1 | 0 | 1 | 0 | 0 | 0 | 1 | |
| 17 | 0 | 0 | 0 | 0 | 0 | 0 | 0 | 0 | 0 | 0 | 0 | 0 | 0 | 0 | |
| 16 | 0 | 0 | 0 | 0 | 0 | 0 | 0 | 0 | 0 | 0 | 0 | 0 | 0 | 0 | S2 (GREEN) |
| 15 | 0 | 0 | 1 | 1 | 0 | 0 | 0 | 0 | 0 | 0 | 0 | 0 | 0 | 0 | |
| 14 | 0 | 1 | 1 | 1 | 1 | 0 | 0 | 0 | 0 | 0 | 0 | 0 | 0 | 0 | |
| 13 | 0 | 1 | 1 | 1 | 1 | 0 | 0 | 0 | 0 | 0 | 0 | 0 | 0 | 0 | |
| 12 | 0 | 1 | 1 | 1 | 1 | 0 | 0 | 0 | 0 | 0 | 0 | 0 | 0 | 0 | |
| 11 | 0 | 1 | 1 | 1 | 1 | 0 | 0 | 0 | 0 | 0 | 0 | 0 | 0 | 0 | |
| 10 | 0 | 1 | 1 | 1 | 1 | 0 | 0 | 0 | 0 | 0 | 0 | 0 | 0 | 0 | |
| 9 | 0 | 0 | 1 | 1 | 0 | 0 | 0 | 0 | 0 | 0 | 0 | 0 | 0 | 0 | |
| 8 | 0 | 0 | 0 | 0 | 0 | 0 | 0 | 0 | 0 | 0 | 0 | 0 | 0 | 0 | S1 (BLUE) |
| 7 | 0 | 0 | 0 | 0 | 0 | 0 | 0 | 0 | 0 | 0 | 0 | 0 | 0 | 0 | |
| 6 | 0 | 0 | 0 | 0 | 0 | 0 | 0 | 0 | 0 | 0 | 0 | 0 | 0 | 0 | |
| 5 | 0 | 0 | 0 | 0 | 0 | 0 | 0 | 1 | 0 | 1 | 0 | 0 | 0 | 0 | |
| 4 | 0 | 0 | 0 | 0 | 0 | 0 | 0 | 0 | 1 | 0 | 1 | 0 | 0 | 0 | |
| 3 | 0 | 0 | 0 | 0 | 0 | 0 | 0 | 1 | 0 | 1 | 0 | 0 | 0 | 0 | |
| 2 | 0 | 0 | 0 | 0 | 0 | 0 | 0 | 0 | 1 | 0 | 1 | 0 | 0 | 0 | |
| 1 | 0 | 0 | 0 | 0 | 0 | 0 | 0 | 1 | 0 | 1 | 0 | 0 | 0 | 0 | |

POSITION NUMBERS e → ROW POINTER f → POSITION POINTER

STEP 7

STACK $S^k$ ARRAYS TO FORM $S^*$

LEGEND

H = NUMBER OF HUES
e = ROW POINTER IN $S^*$
f = POSITION POINTER IN $S^*$
i = ROW POINTER IN $S^k$
j = POSITION POINTER IN $S^k$
m = NUMBER OF ROWS IN $S^k$
n = NUMBER OF POSITIONS IN $S^k$
$s^*_{ef}$ = CONTENTS OF CELL AT POSITION (e,f) IN $S^*$
$s^k_{ij}$ = CONTENTS OF CELL AT POSITION (i,j) IN $S^k$

TRANSFORMATION MATRIX FOR INTERLEAVING ROWS OF COLOR SEPARATION ARRAYS $s^k$ (IN $s^*$) TO FORM OUTPUT ARRAY K

STEP 8

BUILD TRANSFORMATION MATRIX T FOR INTERLEAVING ROWS OF $S^k$ ARRAYS IN $S^*$

LEGEND

H = NUMBER OF HUES m = NUMBER OF ROWS IN EACH $S^k$ v = ROW POINTER IN T w = POSITION POINTER IN T a IS A VARIABLE SUCH THAT $0 \leq a < H$ u IS A VARIABLE SUCH THAT $1 \leq u \leq m$ $t_{vw}$ = CONTENTS OF CELL AT POSITION (v,w) IN T

FIG. 49

OUTPUT ARRAY K
(KNITTING INSTRUCTIONS)

| ARRAY ROW | COURSE | COLOR | STITCH POSITIONS (PER REPEAT) 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| 1 | 1 | B | 0 | 0 | 0 | 0 | 0 | 0 | 0 | 1 | 0 | 1 | 0 | 0 | 0 | 0 |
| 2 | 1 | G | 0 | 0 | 1 | 1 | 0 | 0 | 0 | 0 | 0 | 0 | 0 | 0 | 0 | 0 |
| 3 | 1 | Y | 0 | 0 | 0 | 0 | 0 | 0 | 0 | 0 | 0 | 0 | 0 | 0 | 0 | 0 |
| 4 | 1 | R | 1 | 1 | 0 | 0 | 1 | 1 | 1 | 0 | 1 | 0 | 1 | 1 | 1 | 1 |
| 5 | 2 | B | 0 | 0 | 0 | 0 | 0 | 0 | 0 | 0 | 1 | 0 | 1 | 0 | 0 | 0 |
| 6 | 2 | G | 0 | 1 | 1 | 1 | 1 | 0 | 0 | 0 | 0 | 0 | 0 | 0 | 0 | 0 |
| 7 | 2 | Y | 0 | 0 | 0 | 0 | 0 | 1 | 1 | 1 | 0 | 1 | 0 | 0 | 0 | 1 |
| 8 | 2 | R | 1 | 0 | 0 | 0 | 0 | 0 | 0 | 0 | 0 | 0 | 0 | 1 | 1 | 0 |
| 9 | 3 | B | 0 | 0 | 0 | 0 | 0 | 0 | 0 | 1 | 0 | 1 | 0 | 0 | 0 | 0 |
| 10 | 3 | G | 0 | 1 | 1 | 1 | 1 | 0 | 0 | 0 | 0 | 0 | 0 | 0 | 0 | 0 |
| 11 | 3 | Y | 0 | 0 | 0 | 0 | 0 | 1 | 1 | 0 | 0 | 0 | 0 | 0 | 0 | 1 |
| 12 | 3 | R | 1 | 0 | 0 | 0 | 0 | 0 | 0 | 0 | 1 | 0 | 1 | 1 | 1 | 0 |
| 13 | 4 | B | 0 | 0 | 0 | 0 | 0 | 0 | 0 | 0 | 1 | 0 | 1 | 0 | 0 | 0 |
| 14 | 4 | G | 0 | 1 | 1 | 1 | 1 | 0 | 0 | 0 | 0 | 0 | 0 | 0 | 0 | 0 |
| 15 | 4 | Y | 0 | 0 | 0 | 0 | 0 | 0 | 0 | 1 | 0 | 1 | 0 | 0 | 0 | 0 |
| 16 | 4 | R | 1 | 0 | 0 | 0 | 0 | 1 | 1 | 0 | 0 | 0 | 0 | 1 | 1 | 1 |
| 17 | 5 | B | 0 | 0 | 0 | 0 | 0 | 0 | 0 | 1 | 0 | 1 | 0 | 0 | 0 | 0 |
| 18 | 5 | G | 0 | 1 | 1 | 1 | 1 | 0 | 0 | 0 | 0 | 0 | 0 | 0 | 0 | 0 |
| 19 | 5 | Y | 0 | 0 | 0 | 0 | 0 | 0 | 0 | 0 | 0 | 0 | 0 | 0 | 0 | 0 |
| 20 | 5 | R | 1 | 0 | 0 | 0 | 0 | 1 | 1 | 0 | 1 | 0 | 1 | 1 | 1 | 1 |
| 21 | 6 | B | 0 | 0 | 0 | 0 | 0 | 0 | 0 | 0 | 0 | 0 | 0 | 0 | 0 | 0 |
| 22 | 6 | G | 0 | 1 | 1 | 1 | 1 | 0 | 0 | 0 | 0 | 0 | 0 | 0 | 0 | 0 |
| 23 | 6 | Y | 0 | 0 | 0 | 0 | 0 | 1 | 1 | 0 | 0 | 1 | 1 | 0 | 0 | 1 |
| 24 | 6 | R | 1 | 0 | 0 | 0 | 0 | 0 | 0 | 1 | 1 | 0 | 0 | 1 | 1 | 0 |
| 25 | 7 | B | 0 | 0 | 0 | 0 | 0 | 0 | 0 | 0 | 0 | 0 | 0 | 0 | 0 | 0 |
| 26 | 7 | G | 0 | 0 | 1 | 1 | 0 | 0 | 0 | 0 | 0 | 0 | 0 | 0 | 0 | 0 |
| 27 | 7 | Y | 0 | 1 | 0 | 0 | 0 | 1 | 1 | 0 | 0 | 1 | 1 | 0 | 0 | 1 |
| 28 | 7 | R | 1 | 0 | 0 | 0 | 1 | 0 | 0 | 1 | 1 | 0 | 0 | 1 | 1 | 0 |
| 29 | 8 | B | 0 | 0 | 0 | 0 | 0 | 0 | 0 | 0 | 0 | 0 | 0 | 0 | 0 | 0 |
| 30 | 8 | G | 0 | 0 | 0 | 0 | 0 | 0 | 0 | 0 | 0 | 0 | 0 | 0 | 0 | 0 |
| 31 | 8 | Y | 0 | 0 | 0 | 0 | 0 | 0 | 0 | 0 | 0 | 0 | 0 | 0 | 0 | 0 |
| 32 | 8 | R | 1 | 1 | 1 | 1 | 1 | 1 | 1 | 1 | 1 | 1 | 1 | 1 | 1 | 1 |

| | | | | | | | | | | | | | |
|---|---|---|---|---|---|---|---|---|---|---|---|---|---|
| R | R | R | R | R | R | R | R | R | R | R | R | R | R |
| R | Y | G | G | R | Y | Y | R | R | Y | Y | R | R | Y |
| R | G | G | G | G | Y | Y | R | R | Y | Y | R | R | Y |
| R | G | G | G | G | R | R | B | R | B | R | R | R | R |
| R | G | G | G | G | R | R | Y | B | Y | B | R | R | R |
| R | G | G | G | G | Y | Y | B | R | B | R | R | R | Y |
| R | G | G | G | G | Y | Y | Y | B | Y | B | R | R | Y |
| R | R | G | G | R | R | R | B | R | B | R | R | R | R |

FINAL MULTICOLOR KNITTED DESIGN (ONE REPEAT)